(No Model.)

C. D. ROGERS.
SCREW.

No. 255,459. Patented Mar. 28, 1882.

WITNESSES.

W. H. Thurston.
J. Knight.

INVENTOR.

Charles D. Rogers

United States Patent Office.

CHARLES D. ROGERS, OF PROVIDENCE, RHODE ISLAND, ASSIGNOR TO THE AMERICAN SCREW COMPANY, OF SAME PLACE.

SCREW.

SPECIFICATION forming part of Letters Patent No. 255,459, dated March 28, 1882.

Application filed October 12, 1881. (No model.)

*To all whom it may concern:*

Be it known that I, CHARLES D. ROGERS, of the city and county of Providence, and State of Rhode Island, have invented a new and useful Improvement in Screws; and I do hereby declare that the following specification, taken in connection with the accompanying drawings, forming a part of the same, is a full, clear, and exact description thereof.

My invention relates to the head of the screw; and my improvement consists in forming the head with a continuous rim, countersinking a portion of the head, and providing such portion with a projecting bar or bars, with which the driver can engage when the screw is being driven or removed.

As usually constructed the head of a screw is provided with a diametrical slot or nick, which is produced by the process of milling. Attempts have been made, however, to produce the nick by indenting the head with a punch. Such a screw is shown in Letters Patent of the United States issued to J. Frearson December 9, 1873, No. 145,411. It is impractical, however, to produce screws of the character shown by Frearson in any considerable numbers on account of the delicacy of the punch used to indent the head, the face of which must be so thin and sharp as to be easily broken.

The object of my improvement is to produce a screw without the aid of the usual nicking machinery, the head of which will possess greater strength and durability than is found in the ordinary screw, which will present a desirable appearance, and which can be economically produced in large quantities.

Figure 1:
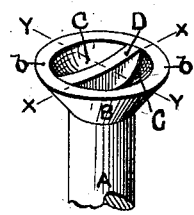
Figure 4:
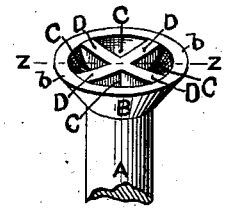
Figure 2:
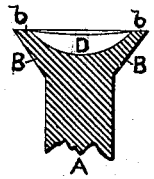
Figure 5:
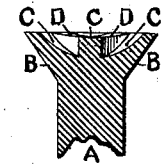
Figure 3:
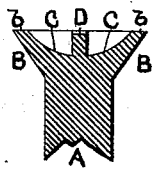
Figure 6:
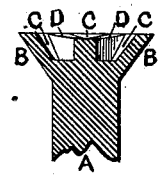

Referring to the drawings, Figures 1 and 4 represent in perspective portions of screws embodying my improvement. Figs. 2 and 3 show sections of Fig. 1 on line *x x* and *y y*, respectively. Fig. 5 represents a section of Fig. 4 on line *z z*, and Fig. 6 shows in section a modified form of cavity in the screw-head.

A is the body or shank of the screw, and B is the head. As shown in each of the figures, the head is surrounded by a continuous rim, *b*, and is countersunk, as at C. I prefer to make the countersunk portion concave, as particularly shown in Figs. 2, 3, and 5; but the form shown in Fig. 6 is equally serviceable. As shown in Fig. 1, the countersunk portion of the head is crossed by a projecting bar, D, which strengthens the head and affords an engagement for a specially-shaped driver having a slot of the requisite width and depth across its face. As shown in Fig. 4, the countersunk portion of the head is crossed by bars D D, preferably at right angles to each other, thereby giving still greater strength to the head. As shown in the drawings, the bar or bars D extend across the countersunk surface C and join the rim *b* of the screw-head. This construction is preferable in that the maximum of strength is secured; but it is within the spirit of my invention to locate the bar or bars centrally on the countersunk surface, and not extend them to the rim. As particularly shown in the sectional views, the faces of the bars D are below the face of the rim *b*. This feature of construction is preferable in that only the rim *b* of the head need be shaved to produce a finished head. Less time, therefore, is required to shave the head, and the shaving-machines can be run at much higher speed.

The countersunk portion and bars of the screw-head are preferably formed when the head is upset in the usual process of manufacture. The tools or punches for forming such portions may be made very durable, so that large quantities of screw-blanks can be made without renewing such tools.

The advantages of my improved screw-head are great strength and durability, a desirable and finished appearance, and economy in manufacture. The form of the head also allows the driver to be made much stronger than the common variety.

What I claim as my invention, and desire to secure by Letters Patent, is—

As an improved article of manufacture, a screw or similar article having a countersunk head, a continuous rim surrounding said countersunk portion, and one or more bars crossing said portion and joining the rim, substantially as set forth.

CHARLES D. ROGERS.

Witnesses:
  W. H. THURSTON,
  I. KNIGHT.